UNITED STATES PATENT OFFICE.

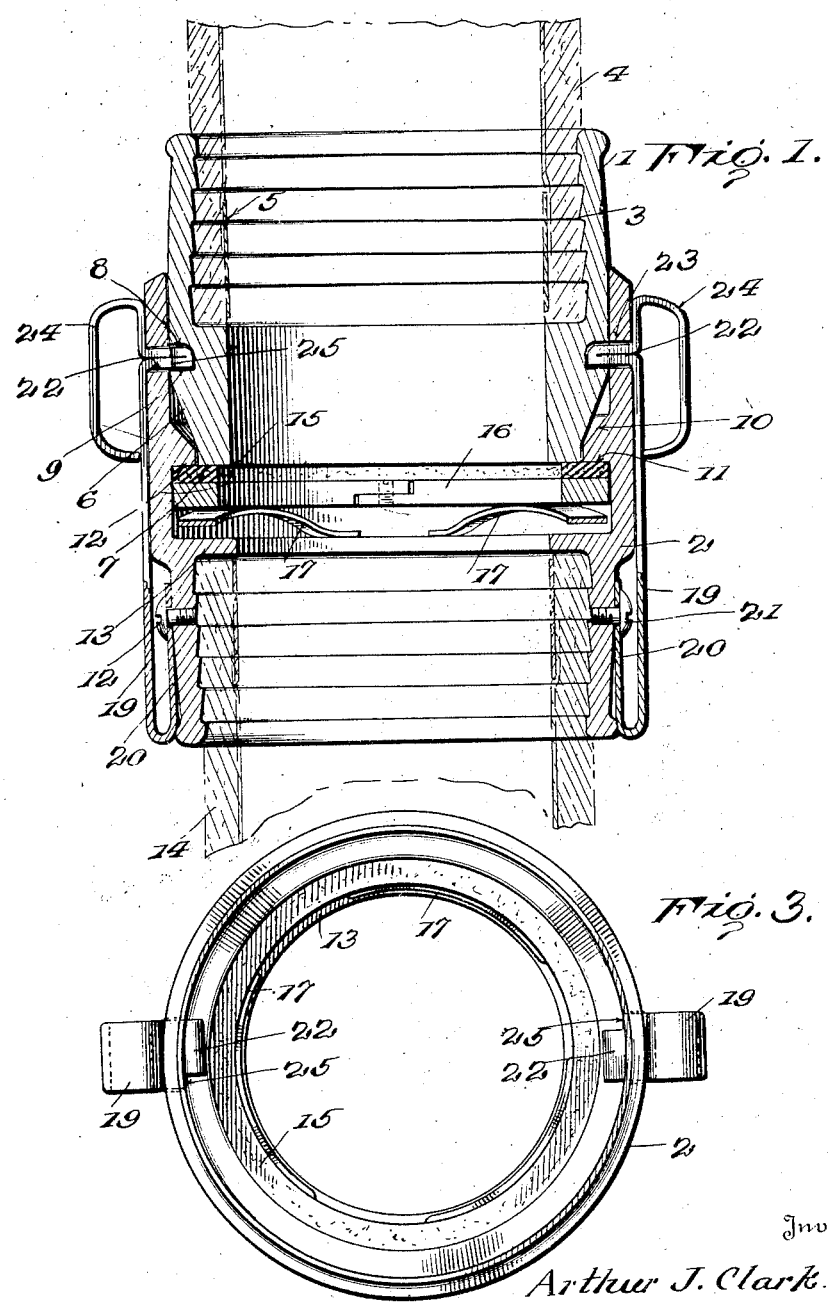

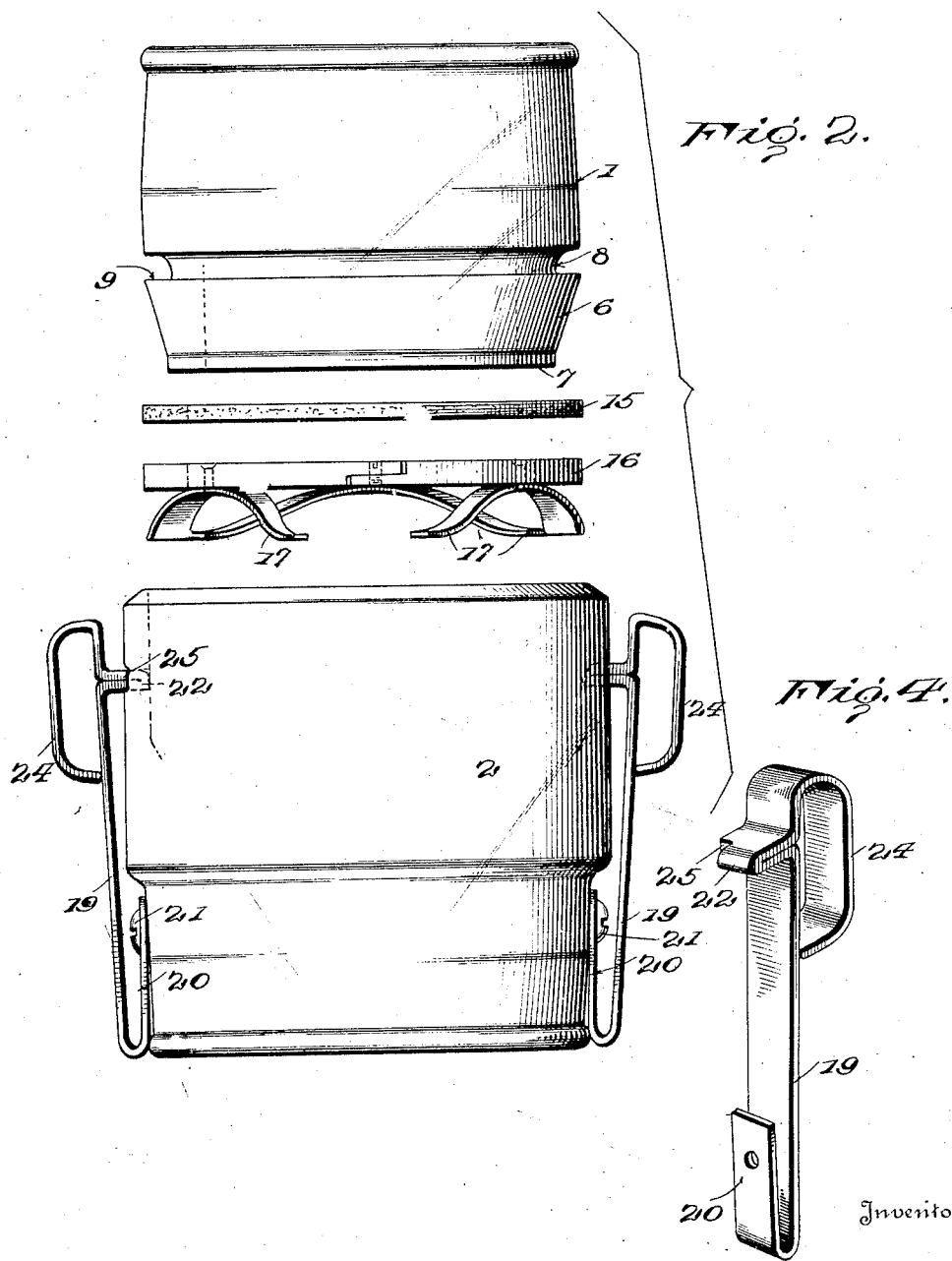

ARTHUR J. CLARK, OF TRAVERSE CITY, MICHIGAN.

HOSE-COUPLING.

1,366,634.  Specification of Letters Patent.  Patented Jan. 25, 1921.

Application filed August 2, 1920. Serial No. 400,794.

*To all whom it may concern:*

Be it known that I, ARTHUR J. CLARK, a citizen of the United States of America, residing at Traverse City, in the county of Grand Traverse and State of Michigan, have invented certain new and useful Improvements in Hose-Couplings, of which the following is a specification.

This invention relates to an improvement in hose couplings, embodying the usual male and female members, and providing for the interlocking of these members in any positions of rotary relation, so that coupling and uncoupling may be readily had without regard to relative positions. Furthermore, each member is substantially swiveled with relation to the other, so that thereby torsional strain upon the hose is avoided, due to the coupling members to adjust themselves to the condition. A simple type of gasket junction between the sections to prevent leakage is provided, this means being at all times under spring tension; and so mounted in the female member, that the relative rotation or swivel action of the members will not in any way affect either all undue wear or displacement of such sealing gasket.

In the drawings:—

Figure 1 is a vertical section showing the members in coupled relation.

Fig. 2 is an elevation, and the parts of the coupling shown separated.

Fig. 3 is an end view of the female member.

Fig. 4 is a perspective view of the locking arm.

The coupling of this invention comprises a male member 1 to be connected to a hose end, usually the hydrant or supply end, and a female member 2, into which the male member is fitted and locked in making the coupling.

The male member 1 comprises a cylindrical section of appropriate length and diameter, interiorly formed at one end, as at 3, to receive a hose end 4, with any appropriate means as a band 5, for securing the hose in non-leaking connection with such member. The operative or forward end of the member 1 is slightly convergent at 6 or the outer surface, terminating in a square face 7. The member 1 directly in rear of the inclined or converging surface 6, is formed in the outer surface with an annular channel 8 having the forward edge 9 thereof at a right angle to the axis of the member, the outer edge being rounded.

The female member 2 of the coupling comprises a cylindrical section having a diameter to receive the male member. The wall of the female member, some distance from the male member entrant end thereof, is interiorly formed with a limiting, annular shoulder 10, the edge next the male entrant end being inclined at 11, the opposite edge being at right angles to the axis of the section as at 12. Inwardly of and spaced from the shoulder 10, the wall of the female member is interiorly formed with an annular supporting ledge 13, preferably of greater width than the shoulder 10. Below the ledge 13, the diameter of the female member is somewhat reduced exteriorly and interiorly, and interiorly formed to provide for the non-leaking junctions of a hose end therewith, as at 14.

The junction-sealing means between the male and female members 1 and 2 is arranged between the shoulder 10 and ledge 13, and comprises a sealing gasket 15 adapted to normally underlie the shoulder 10, the gasket projecting inwardly beyond the edge of the shoulder as shown. The gasket is supported and yieldingly held against the shoulder 10 by a supporting member made up of a three part ring 16, to each part of which is secured a leaf spring 17, curved so that its ends 18 rest on the ledge 13. These springs normally force the gasket with an even pressure against the shoulder, and yet the complete independence of the parts of the ring 16 provides for taking up any irregularity in bearing without sacrificing any sealing effect of the gasket.

The locking means for securing the male and female members in coupled relation, comprises spring arms 19, secured through return bent portions 20 and rivets 21 to the female member 2, in the reduced portion thereof. The locking ends of the arms are provided with locking lugs 22 of a size to pass through openings 23 in the female member. These lugs are shaped at their free or engaging ends to more or less accurately fit the channel 8 of the male member, the inclined surface 6 of the male member displacing the lugs in the coupling operation, and permitting such lugs to ride into the channel 8 when the coupling movement is complete. The locking operation is of course automatic, and the unlocking, to permit uncoupling, is readily effected by withdrawing the lugs 22 from the channel. The free ends of the arms 19 may be formed as return loops 24 to provide for convenient operation of the arms, and if desired, and as preferred, the edges of the lugs may be notched or cut away, as at 25, to permit the arms to be turned slightly on their holding rivets and the notched edges engaged with the walls of the openings 23. This position of the lugs will hold the same free of the channel 8 to permit convenient uncoupling. The arms may, however, be simply held out by pull thereon to free the male member if desired, though provision of the holding notches is preferred.

The locking position of the male member within the female member is such that with the lugs 22 seated in the channel 8, the free edge or face 7 of the male member is bearing squarely on the gasket 15, and is in direct line with the gasket-engaged edge of shoulder 10. The spring pressed gasket thus bears squarely against these portions, and a non-leaking junction of the male and female member is provided.

It is to be particularly noted that by reason of the annular channel 8, the locking connection between the coupling members is a swiveled one, and that the members may turn more or less freely, relative to one another, without disturbing the sealing juncture.

Claims:—

1. A hose coupling comprising a male member and a female member, means for locking the members following an endwise movement thereof to permit free relative rotary movement, a gasket carried by the female member to be engaged by the male member prior to the locking position of the latter, a multi-part ring underlying and supporting the gasket, and a spring exerting pressure upon each part of the ring.

2. A hose coupling comprising a male member formed with an annular channel, a female member to receive the end of the male member, spring arms carried by the female member, lugs carried by said arms to pass through openings in the female member and engage in said channel to lock the members together, a shoulder formed interiorly of the female member, a ledge formed interiorly of the female member in spaced relation to the shoulder, a sealing gasket arranged below the shoulder and projecting inwardly beyond the same, a three-part metal ring under-lying the gasket, and a spring secured to each rim part and bearing on the ledge, whereby to hold the gasket normally in contact with the shoulder and permit movement of the gasket under increased spring pressure by the end of the male member in the locking movement of the members.

In testimony whereof I affix my signature.

ARTHUR J. CLARK.